(12) United States Patent
Park

(10) Patent No.: US 10,710,675 B2
(45) Date of Patent: Jul. 14, 2020

(54) ELECTRIC BIKE

(71) Applicant: Chanmin Park, Beverly Hills, CA (US)

(72) Inventor: Chanmin Park, Beverly Hills, CA (US)

(*) Notice: Subject to any disclaimer, the term of this patent is extended or adjusted under 35 U.S.C. 154(b) by 250 days.

(21) Appl. No.: 16/015,158

(22) Filed: Jun. 21, 2018

(65) Prior Publication Data
US 2018/0370593 A1 Dec. 27, 2018

Related U.S. Application Data

(60) Provisional application No. 62/523,239, filed on Jun. 21, 2017.

(51) Int. Cl.
B62M 6/60 (2010.01)
B60L 7/18 (2006.01)
B62M 23/00 (2006.01)
B62M 6/80 (2010.01)
B62M 11/14 (2006.01)
B62M 6/45 (2010.01)
B62K 21/00 (2006.01)
B62M 6/65 (2010.01)
B62M 1/16 (2006.01)
B62K 25/04 (2006.01)
(Continued)

(52) U.S. Cl.
CPC ............... *B62M 6/60* (2013.01); *B60L 7/18* (2013.01); *B60L 50/20* (2019.02); *B62K 5/027* (2013.01); *B62K 21/00* (2013.01); *B62K 25/04* (2013.01); *B62L 3/02* (2013.01); *B62M 1/12* (2013.01); *B62M 1/16* (2013.01); *B62M 6/45* (2013.01); *B62M 6/65* (2013.01); *B62M 6/70* (2013.01); *B62M 6/80* (2013.01); *B62M 6/90* (2013.01); *B62M 11/14* (2013.01); *B62M 19/00* (2013.01); *B62M 23/00* (2013.01); *B60L 2200/12* (2013.01); *B62K 2025/045* (2013.01)

(58) Field of Classification Search
CPC . B62M 6/60; B62M 1/12; B62M 1/16; B62M 6/45; B62M 6/65; B62M 6/70; B62M 6/80; B62M 6/90; B62M 11/14; B62M 19/00; B62M 23/00; B60L 50/20; B60L 7/18; B60L 2200/12; B62K 21/00; B62K 25/04; B62K 2025/045; B62L 3/02
See application file for complete search history.

(56) References Cited

U.S. PATENT DOCUMENTS

2012/0048635 A1* 3/2012 Kuroki ................ B60L 50/20
180/206.2
2014/0039741 A1* 2/2014 Tanaka ................ B60L 15/20
701/22

(Continued)

*Primary Examiner* — Jacob D Knutson
*Assistant Examiner* — Marlon A Arce

(57) ABSTRACT

An electric bike comprises a front wheel, a rear wheel, a seat for a rider to sit on, a frame that supports the front wheel, the rear wheel and the seat, a driving device that provides moving energy to the electric bike and a braking device that reduces the speed of the electric bike. The driving device comprises one or more electric motors. The electric bike further comprises a pedal assembly that receives muscle power from the rider. The pedal assembly comprises a pedal axis and two pedals fixed to the pedal axis. The torque from the pedal assembly is not mechanically transferred to the front wheel or the rear wheel.

8 Claims, 8 Drawing Sheets

(51) Int. Cl.
*B62M 6/70* (2010.01)
*B62M 6/90* (2010.01)
*B62L 3/02* (2006.01)
*B62K 5/027* (2013.01)
*B62M 1/12* (2006.01)
*B62M 19/00* (2006.01)
*B60L 50/20* (2019.01)

(56) References Cited

U.S. PATENT DOCUMENTS

| | | | | |
|---|---|---|---|---|
| 2014/0121877 | A1* | 5/2014 | Hosaka | B62M 6/45 |
| | | | | 701/22 |
| 2014/0125032 | A1* | 5/2014 | Haan | B62M 1/12 |
| | | | | 280/233 |
| 2015/0210346 | A1* | 7/2015 | Lofgren | B62L 3/02 |
| | | | | 280/249 |
| 2016/0031506 | A1* | 2/2016 | Lloyd | B62M 6/90 |
| | | | | 701/49 |
| 2016/0121963 | A1* | 5/2016 | Tanaka | B60L 58/12 |
| | | | | 701/22 |
| 2016/0272278 | A1* | 9/2016 | Yamada | H02P 7/18 |
| 2016/0318577 | A1* | 11/2016 | Hayslett | B62M 6/55 |

* cited by examiner 70 72 68

ELECTRIC BIKE

CROSS-REFERENCE TO RELATED APPLICATION

This application is based on the inventor's Provisional Application No. 62/523,239 filed on Jun. 21, 2017, the disclosure of which is incorporated by reference.

TECHNICAL FIELD

This invention is related to an electric bike.

BACKGROUND ART

Electric bikes by prior art adopts hybrid form that uses both the traditional pedal powered drive train and a motor assisting the pedal power.

SUMMARY OF THE INVENTION

The present invention provides an electric bike comprising a front wheel, a rear wheel, a seat for a rider to sit on, a frame that supports the front wheel, the rear wheel and the seat, a driving device that provides moving energy to the electric bike; and a braking device that reduces the speed of the electric bike. The driving device comprises one or more electric motors.

The electric bike further comprises a pedal assembly that receives muscle power from the rider. The pedal assembly comprises a pedal axis and two pedals fixed to the pedal axis.

Preferably, the torque from the pedal assembly is not mechanically transferred to the front wheel or the rear wheel.

The bike further comprises an upper body force receiving device that is adapted to receive moving energy from hands of the rider. The upper body force receiving device comprises a crank mechanism or a pivot mechanism. The motor and/or the brake are controlled to compensate shaking of rider's body according to upper body movements.

The braking device comprises a regenerative motor that converts torque made by the decelerating bike to electricity.

The pedal assembly further comprises a generator that is driven by the rider's pedaling.

The generator comprises a regenerative motor that receives torque made by the wheel of the decelerating bike.

A belt drive connects the rear wheel and the pedal assembly. A sealed case encloses the driving device, the braking device and/or the pedal axis and the generator of the pedal assembly.

The driving device and the braking device are integrated into a regenerative motor.

The electric bike further comprises a control device that controls the driving device, the braking device and/or the pedal assembly.

The driving device further comprises a speed change mechanism that connects the motor and the wheel axis. The control device controls output of the motor of the driving device.

The braking device controls braking force to prevent a sudden stop of the bike. A sensor monitors the deceleration of the bike, and the control device controls the braking force of the braking device to keep the deceleration below a predetermined value.

A third wheel is provided coaxial with the pedals or near the pedals and connected to the pedal axis by gears. The third wheel is driven by a motor. The third wheel is spring loaded to keep contact with road.

The electric bike further comprises a suspension device. The suspension device comprises a linear alternator or a regenerative motor with a worm gearset. The suspension device is controlled to adjust its stiffness and/or its stroke.

The control device controls the motor and speed change device of the driving device, the braking device and the suspension device.

The motor of the driving device is provided between the pedal axis and the rear axle. A chain or belt drive connects the pedal axis, the motor and the rear axle. A battery is surrounded by the belt in a sealed case.

A brake lever does not normally provide a braking force but a control signal controlling the regenerative brake. At an emergency, the brake lever provides force required for a mechanical brake device thereby operating an additional brake device.

The control device controls the driving power and braking power of the front and rear wheels depending on rider's operation of a brake lever or a drive lever, sensing movement of rider's body with respect to the frame with a motion sensor, or the trail information sensed by its visual sensor, or pre-stored or network received geographic information.

When a brake lever is pressed strongly, braking power of the electric brake that comprises the regenerative motor is adjusted strong. The speed change ratio of the speed change gear between the wheel and generator is controlled.

The speed change device for motor comprises epicyclic gearing (planetary gear) or harmonic gear.

The electric bike further comprises an electrically operated steering device. The control device controls the steering device, the braking device and the driving device to keep stable movement of the bike.

The control device controls the driving device to provide initial momentum to help the rider to start.

The pedal axis is rotated by electric force to give assisting or resistive force to the feet of the rider to enhance real or fun feeling. A sensor is installed to sense the rotation of the pedal axis to decide the pattern of the pedaling by rider, and controls the operation of the motor assembly, brake, suspension, steering, according to the pattern.

DETAILED DESCRIPTION OF THE INVENTION

Figure 1:
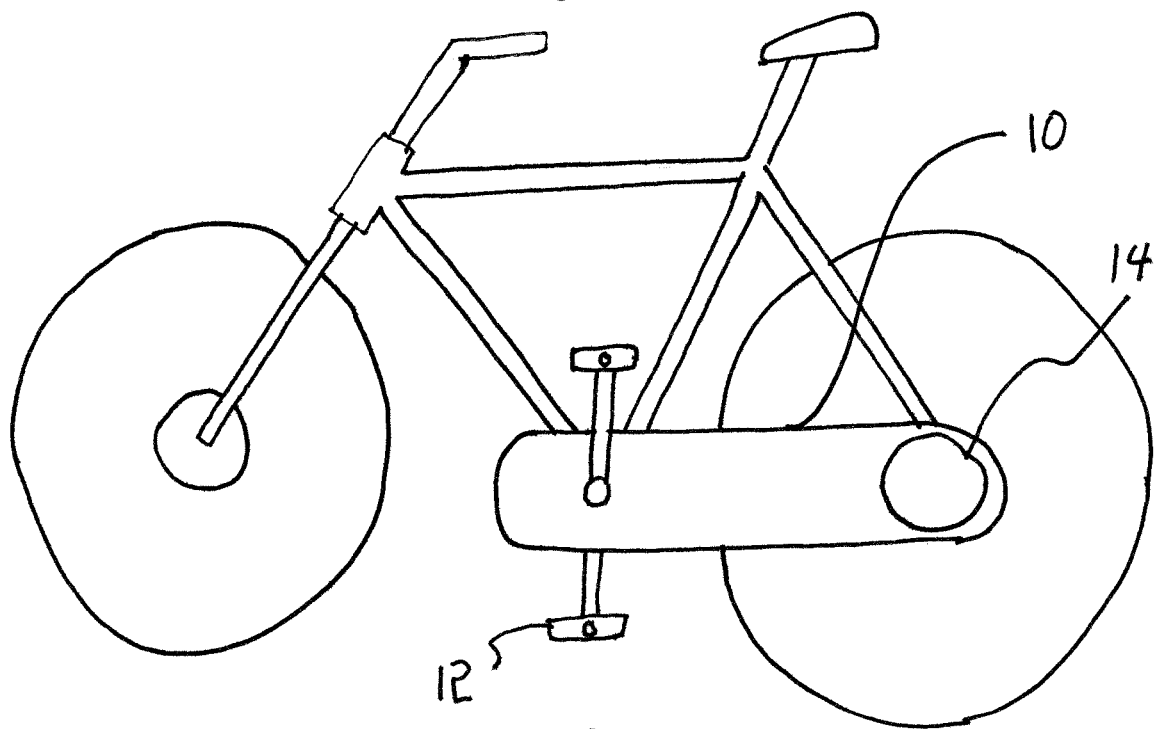
FIG. 1 is an elevation view showing a first embodiment of an electric bike according to the present invention.

FIG. 1 shows a first embodiment in which mechanisms are concentrated within a rectangular box 10 having oval or semi-circular ends located between the pedals 12 and the rear wheel motor assembly 14 thereby simplifying design of other parts. Functions of other categories are performed by change of parts installed in the box per intended purpose, and remaining parts may be standardized and manufactured in mass.

Figure 2:
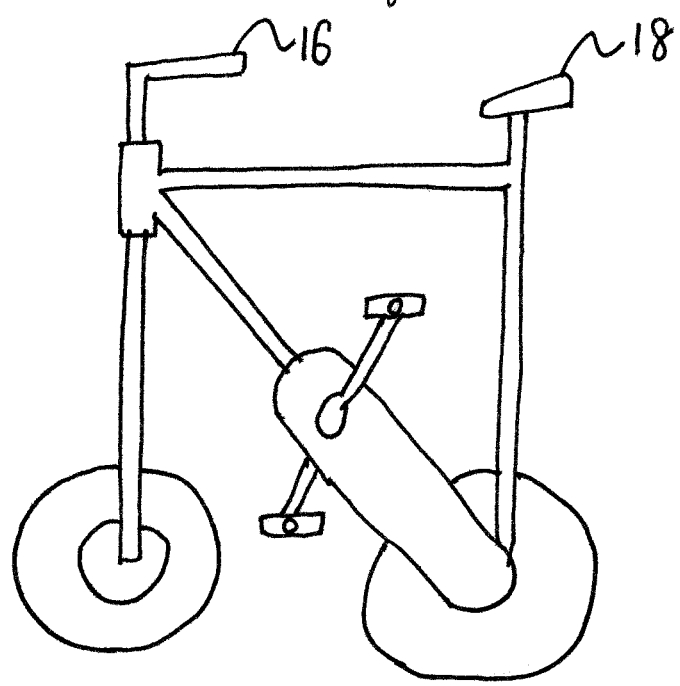
FIG. 2 is an elevation view showing a second embodiment of an electric bike.

FIG. 2 shows a second embodiment in which a predetermined size is needed between the handle 16 and the seat 18 considering ergonomics, but other parts may be made compact facilitating loading the bike in a car or a train.

Figure 3:
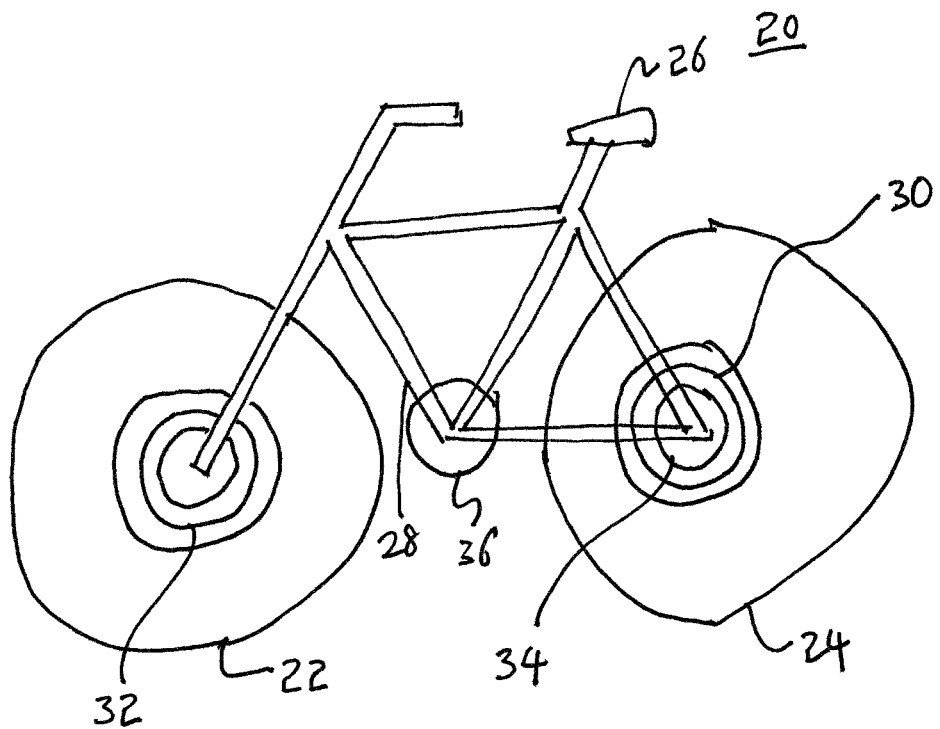
FIG. 3 is a schematic view showing an electric bike.

FIG. 3 shows an electric bike 20 comprising a front wheel 22, a rear wheel 24, a seat 26 for a rider to sit on, a frame 28 that supports the front wheel, the rear wheel and the seat, a driving device 30 that provides moving energy to the electric bike; and a braking device 32 that reduces the speed of the electric bike. The driving device comprises one or more electric motors 34.

Figure 4:
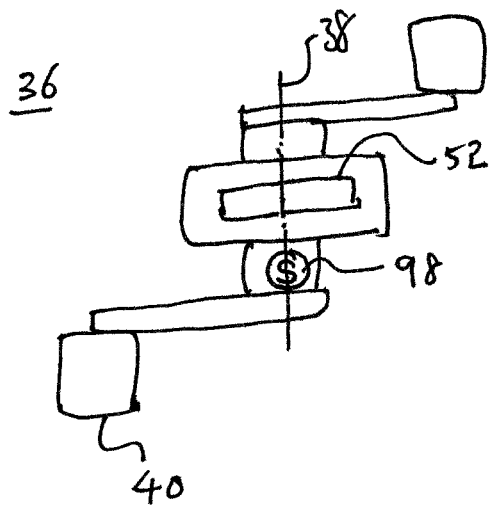
FIG. 4 is a schematic view showing a pedal assembly.

FIG. 4 shows a pedal assembly 36 that receives muscle power from the rider. The pedal assembly comprises a pedal axis 38 and two pedals 40 fixed to the pedal axis. The torque from the pedal assembly is not mechanically transferred to the front wheel or the rear wheel.

Figure 5:
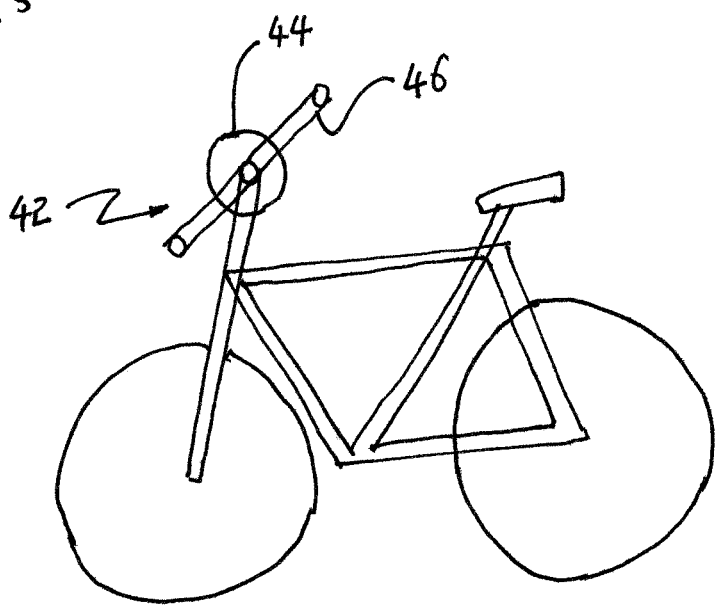
FIGS. 5 and 6 are schematic views showing upper body force receiving devices.
Figure 6:
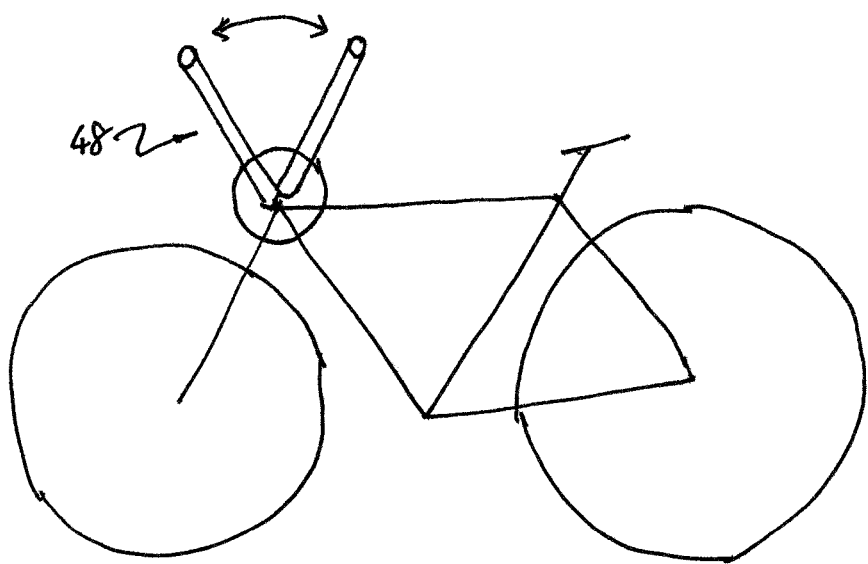

FIGS. 5 and 6 show that the bike further comprises an upper body force receiving device 42 that comprises a generator 44 that is adapted to receive moving energy from hands of the rider and to convert it to electricity. The upper body force receiving device comprises a crank mechanism 46 or a pivot mechanism 48. The motor 30 and/or the brake 32 are controlled to compensate shaking of rider's body according to upper body movements.

Figure 7:
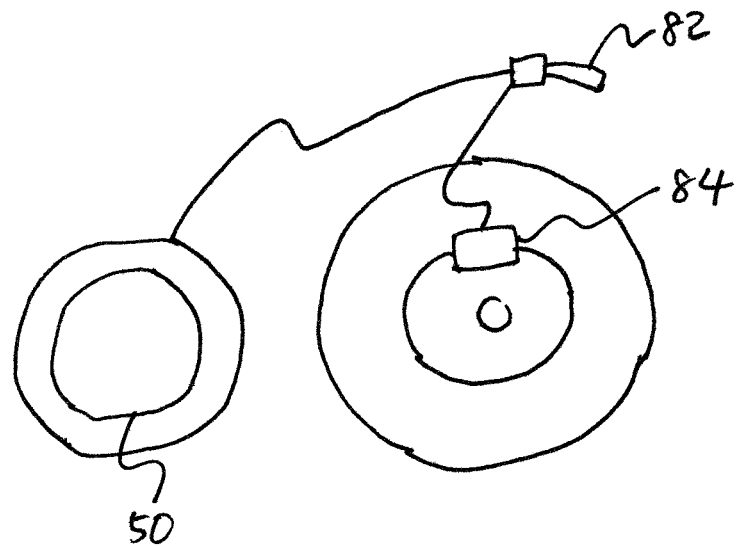
FIG. 7 is a schematic view showing a braking device.

FIG. 7 shows that the braking device comprises a regenerative motor 50 that converts torque made by the decelerating bike to electricity.

Referring back to FIG. 4, the pedal assembly further comprises a generator 52 that is driven by the rider's pedaling. The generator is a regenerative motor that receives torque made by the wheel 22, 24 of the decelerating bike.

Figure 8:
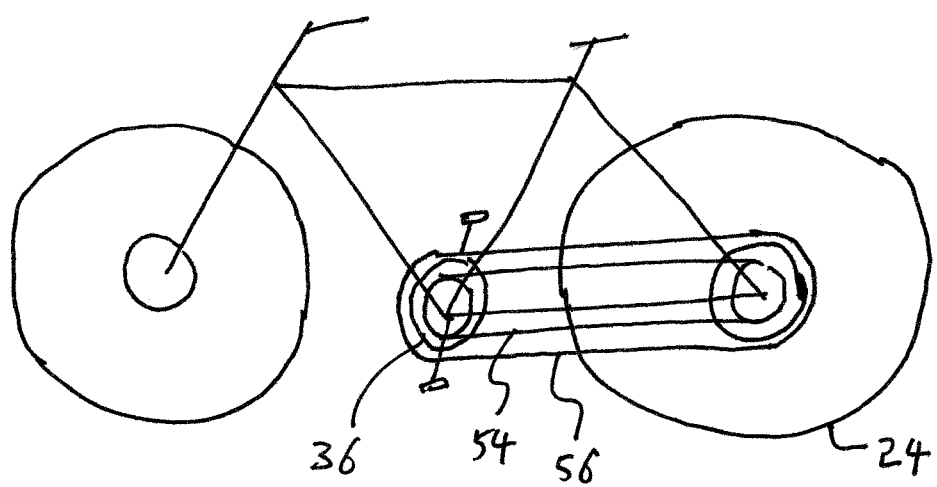
FIG. 8 is a schematic view showing a belt drive and a case.

FIG. 8 shows that a belt drive 54 connects the rear wheel and the pedal assembly. A sealed case 56 encloses the driving device, the braking device and/or the pedal axis and the generator of the pedal assembly.

Figure 9:
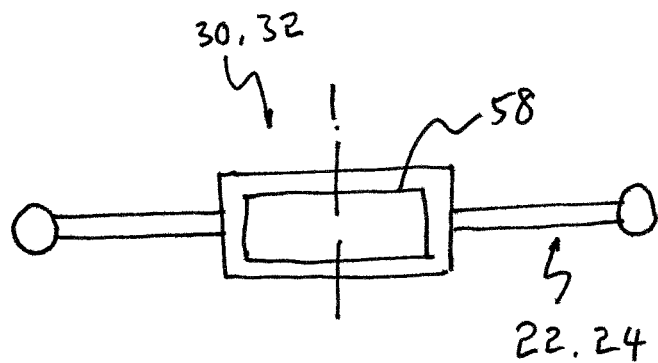
FIG. 9 is a schematic view showing a regenerative motor that integrates the drive device and braking device.

FIG. 9 shows that the driving device and the braking device are integrated into a regenerative motor 58.

Figure 10:
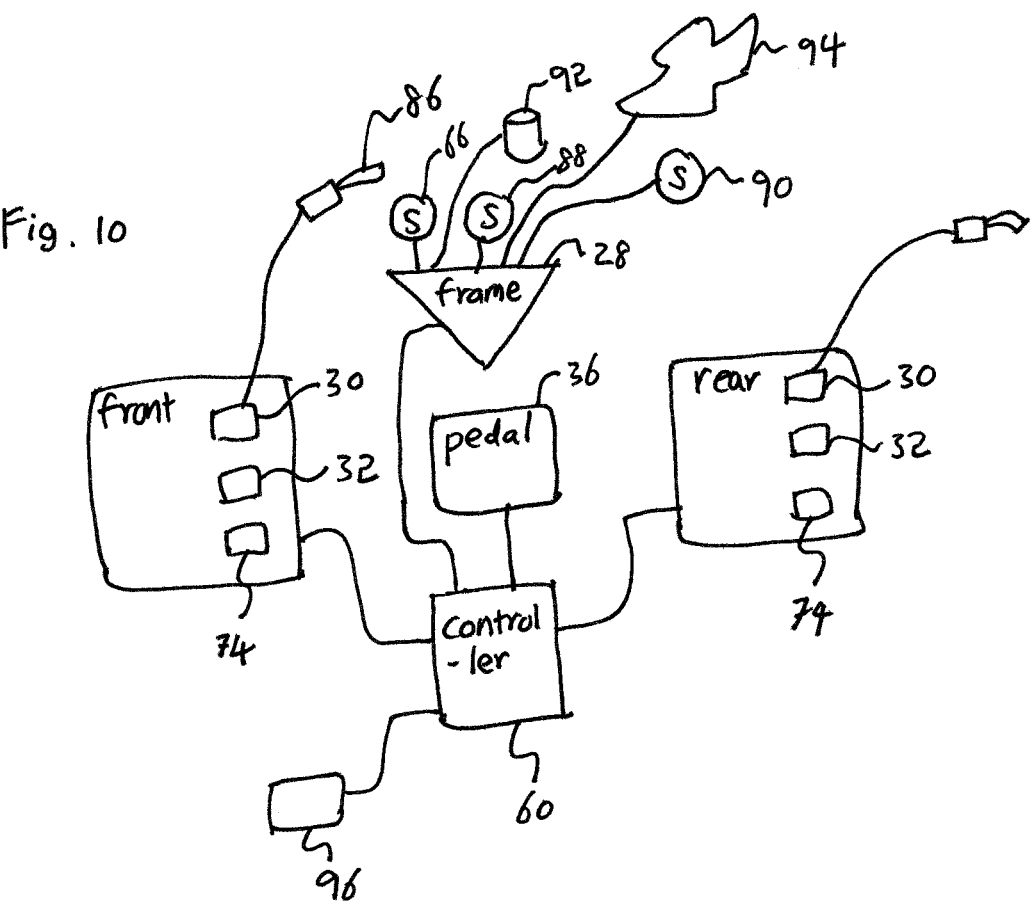
FIG. 10 is a block diagram showing a control device.

FIG. 10 shows that the electric bike further comprises a control device 60 that controls the driving device, the braking device and/or the pedal assembly. Elements are connected electrically in power and electronically in signal.

Figure 11:
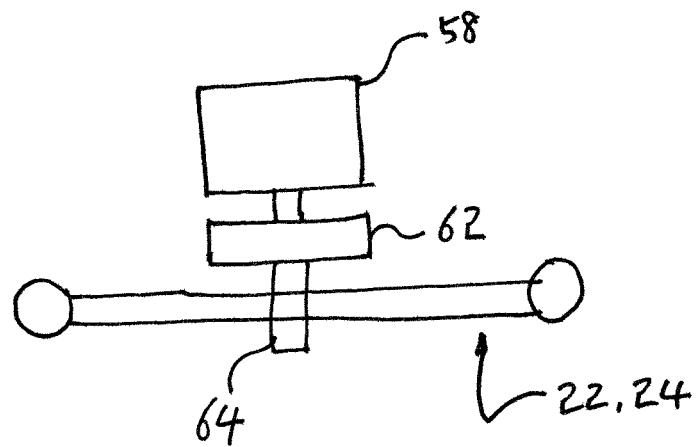
FIG. 11 is a schematic view showing a third wheel.

FIG. 11 shows that the driving device further comprises a speed change mechanism 62 that connects the motor and the wheel axis 64. The control device controls output of the motor of the driving device.

The braking, device controls braking force to prevent a sudden stop of the bike. A sensor 66 (refer to FIG. 10) monitors the deceleration of the bike, and the control device controls the braking force of the braking device to keep the deceleration below a predetermined value.

Figure 12:
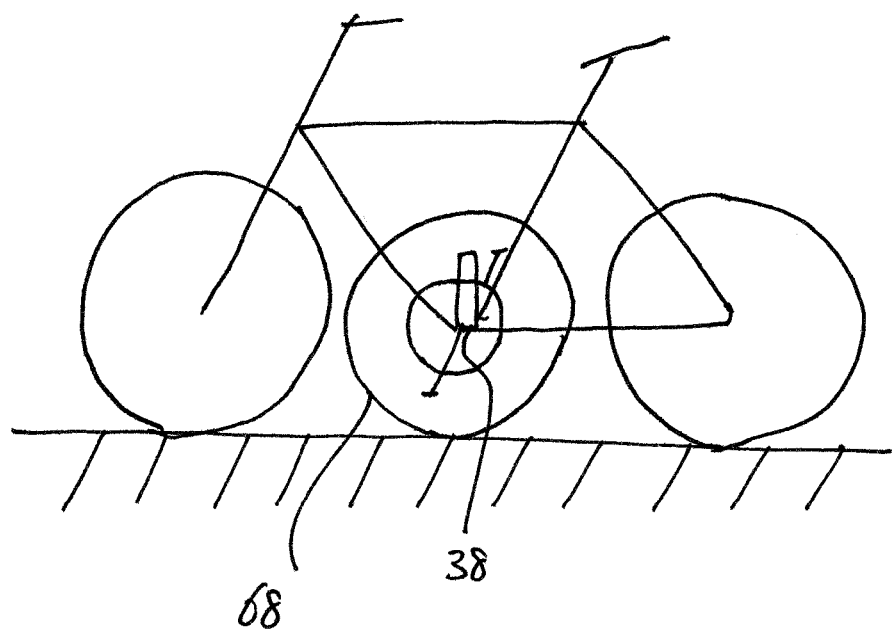
FIG. 12 and FIG. 13 are schematic diagrams showing a third wheel.
Figure 13:
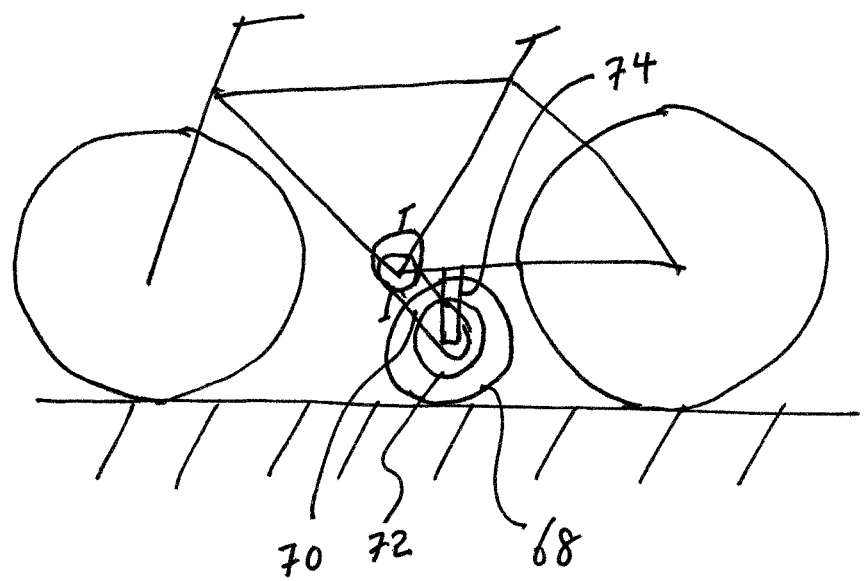

FIGS. 12 and 13 show that a third wheel 68 is provided coaxial with the pedals or near the pedals and connected to the pedal axis by gears. The third wheel is driven by a motor 70. The third wheel is spring loaded 74 to keep contact with road.

Figure 14:
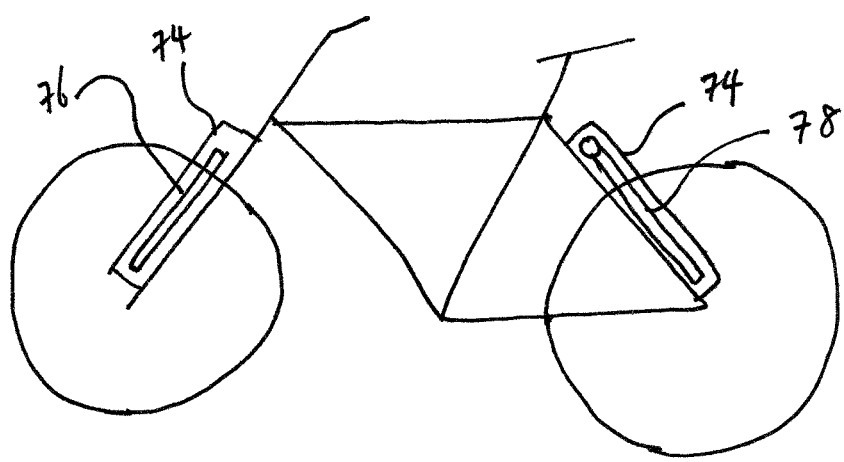
FIG. 14 is a schematic view showing a suspension device.

FIG. 14 shows a suspension device 74. The suspension device comprises a linear alternator 76 or a regenerative motor 78 with a worm gearset. The suspension device is controlled to adjust its stiffness and/or its stroke.

Referring back to FIG. 10, the control device controls the motor and speed change device of the driving device, the braking device and the suspension device.

Figure 15:
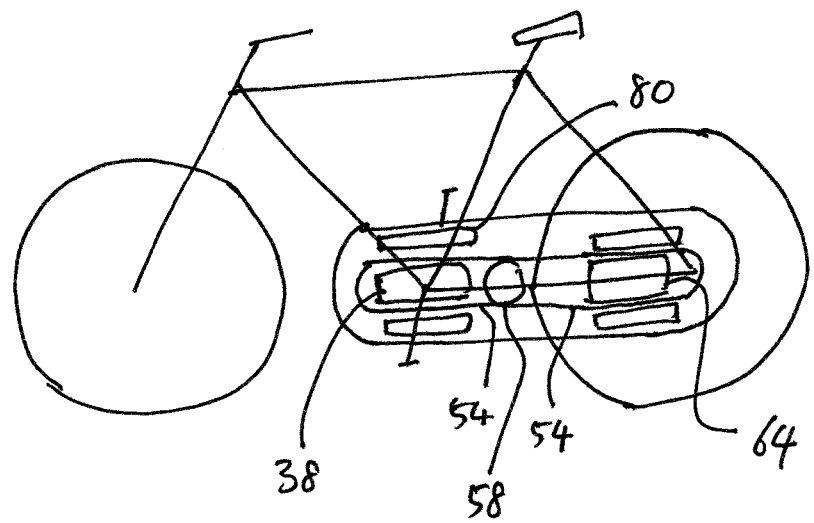
FIG. 15 is a schematic view showing the position of the motor.

FIG. 15 shows that the motor of the driving device is provided between the pedal axis and, the rear axle. A chain or belt drive connects the pedal axis, the motor and the rear axle. Batteries 80 are surrounded by or adjacent to the belt in the sealed case.

Referring back to FIG. 7, a brake lever 82 does not normally provide a braking force but a control signal controlling the regenerative brake. At an emergency, the brake lever provides force required for a mechanical brake device 84 thereby operating an additional brake device.

Referring back to FIG. 10, the control device controls the driving power and braking power of the front and rear wheels depending on rider's operation of the brake lever or a drive lever 86, sensing movement of rider's body with respect to the frame with a motion sensor 88, or the trail information sensed by its visual sensor 90, or pre-stored 92 or network 94 received geographic information.

When a brake lever is pressed strongly, braking power of the electric brake that comprises the regenerative motor is adjusted strong. The speed change ratio of the speed change gear between the wheel and generator is controlled.

The speed change device for motor comprises epicyclic gearing (planetary gear) or harmonic gear.

Figure 16:
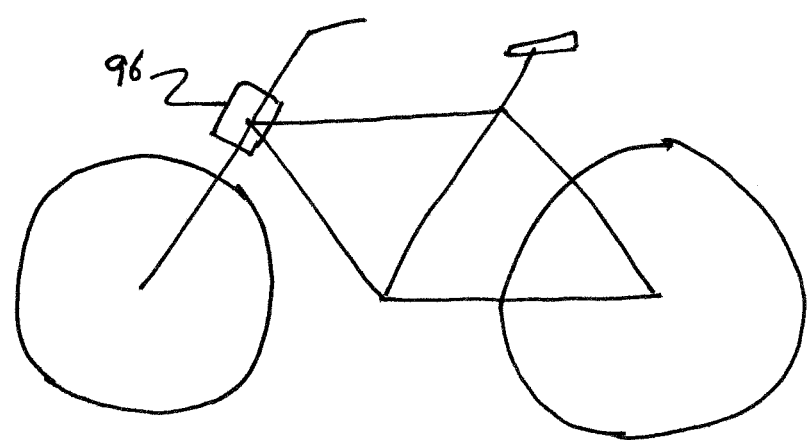
FIG. 16 is a schematic view showing an electrically operated steering device.

FIG. 16 shows an electrically operated steering device 96 that rotates the axis to which the handle is attached. The control device controls the steering device, the braking device and the driving device to keep stable movement of the bike.

The control device controls the driving device to provide initial momentum to help the rider to start.

The pedal axis is rotated by electric force to give assisting or resistive force to the feet of the rider to enhance real or fun feeling. A sensor 98 is installed to sense the rotation of the pedal axis to decide the pattern of the pedaling by rider, and controls the operation of the motor assembly, brake, suspension, steering, according, to the pattern, which are performed by the control device.

Due to spread of self-driving vehicles, riding a bike in a crowded street would become safe. Self-driving cars constitute public transportation rather than privately owned cars. Bikes would be the main means for short-distance moving. People would have a habit of putting personal belongings to a storage attached to a bike when they do not own a car but a bike. A secure storage for a bike may have a biometric recognition capability for an owner's privacy like a smart phone. A role division is established in which a self-driving vehicle covers heave cargo and long distance, and a bike covers short distance and light cargo transportation. A transportation grid is formed with self-driving cars and bikes via Internet. A service station in urban area provides functions including a bike storage, bike locating, theft protection, etc.

Both human power and electric power are used to drive a bike. The mechanism can be made compact if the electric power is the main power. A brake system is electrically operated, and front and rear brakes are controlled in concert according to bike riding conditions. When the brake is operated, or the torque exerted on the pedal is more than needed at a flat road or downhills, the role of the motor is changed to a generator and therefore there is no driving force from the motor. A bike frame can be designed to have an integral space receiving a battery, mechanism, essential maintenance tools, private stuffs, etc.

Owning a bike is advantageous because electronic devices are personalized; size, seat and other personal tunings are different per user, and requirements for a bike differs according to body, habit, muscle power of a user since a bike is driven by human body. A bike is small and cheap and therefore good for owning. A self-driving car requires a garage and frequency of using is less and therefore is adequate for public transportation rather than private owning. Unlike a privately-owned car, a user should always take care of her belongings. Therefore, a logistics service must be combined with self-driving car transportation system.

A motor and a generator are integrated using regenerative braking. A small sealed case encloses a high-speed rotating motor and a speed reduction gear that connects the motor with a low-speed rotating bike wheel thereby protecting them from dust, moisture, external impact, etc. and facilitating lubrication. When a rider presses a brake lever, a regenerative brake is operated to produce electricity, and the torque used for generation provides the braking power. While a brake lever does not provide a braking force but a control signal controlling the regenerative brake, but at an emergency, the lever provide force required for a mechanical brake device thereby operating an additional brake device. The driving force needed for a bike is not big and therefore a motor assembly including speed reduction gear and a brake may be provided in a small space. An emergency brake that provides the additional braking force in addition to torque used for generation may be provided in a small form like a rim brake.

A standardized electronic device including hardware, software, network, camera, etc., which is adequate for mass production, may be installed on a bike to provide communication and control. Bikes can be incorporated into a new transportation and delivery system, in which self-driving cars forms the center. A rider's recognition, fee payment and choice of functions are performed by linking a controller installed on a bike with hand motion of a user, receiving voice command or a smart phone app.

A bike may be used not only for short-distance travel but also as whole-body exercise device. In addition to leg exercise with pedaling, upper body exercise is possible with a handle that enables rowing like exercise. A pivot movement made by front and back movement of a handle can be converted to rotational movement that drives a generator. A bike suggests a bike exercise program that combines upper body exercise, lower body exercise and their strength change, and a rider chooses a course per her need.

In everyday transportation, if electric energy is accumulated more than needed for driving a bike, it can be transferred to home electricity storage device. Or the surplus electricity may be transferred to an electricity storage device of a service station at the destination. This is an incentive for riding a bike, generating and using electricity with pedaling or exercise with handle.

Technology developed for self-driving vehicles may be applied to a bike. Since a bike is a travel means, a rider travels to a desired location in day time, for example, when she bought goods, the bike may carry the goods and come home by self-driving, and the rider may come home at night using other transportation means like a self-driving car. Alternatively, the bike may self-drive to a nearby bike storage, and stand by at a location that the rider designates. For long distance travel, a self-driving car may pick up a bike and deliver it to the rider's home.

A mountain bike requires more manual override. Limits for braking power and driving power must be high, too. A motor assembly may be provided at the front wheel, too. Naturally, it is easy to design driving power of a motor to be bigger than that of human power and an electric powered brake may be added in addition to regenerative brake assuming weight increase. Braking power may be partially provided, by depending on a manual lever or an electric brake linked thereto. Hardware and software control the driving power and braking power of the front and rear wheels depending on rider's operation of a lever, sensing movement of rider's body with respect to the frame, or the trail information sensed by its sensor. Starting point is an electric bike that provides additional driving force at uphill, and the ultimate goal is an artificial intelligence type robot bike that provides diverse functions and degree of control freedom in a rider's control. Driving force by pedaling is transferred to the rear wheel motor assembly via a chain, timing belt, gear train, etc, and transferred to the rear wheel either combined with motor driving force or independently via a clutch, etc.

With pure electric driving construction, only a generator is equipped at the pedals, and the pedals and the rear wheel are connected only with electricity. Further, when suspension is included at motor assemblies at the front and rear wheels, the remaining parts of a bike become very simple. Suspension may be a fluid suspension with fluid clutch. A suspension may be formed as a cantilever between a frame and a motor assembly thereby simplifying frame structure. A suspension may only be provided at the seat post. A mountain bike may adopt prior art suspension devices for absorbing impacts from jump, etc. Especially for road bikes, a battery has a role of buffer. At flat road and downhill, charging occurs from pedaling and braking, and at uphill, driving force of the motor assists the pedaling.

A pneumatic tire would become obsolete because spokes or a disc made of new material provide elasticity. Suspension is provided at the motor assembly using fluid clutch, etc. and seat suspension is used, the interior of tire may be filled with foam material not tube thereby removing the problem of flat tire. By solving problem of increased tire weight with help of motor driving force, bike tire can be made as durable as automotive tires. A timing belt or belt drive is used to connect a pedal gear and rear gear and a cover is provided for them. A space inside the cover may be used for housing a battery. Then the pedal gear becomes simple gear, and mechanisms are completely concentrated in the rear motor assembly. Gears connected to pedal, rear wheel axis or motor assembly are made of plastic gear, and the belt is toothed belt, reducing need of lubrication minimal or zero. The size of gear is minimized while adequate for winding a toothed belt. A battery and a storage space may be positioned front for weight distribution. Not like a mountain bike for which control is important, a bike mainly for road riding may have smaller wheels resembling a scooter. The center of gravity becomes lower, the tires become smaller, and it is easier to make a folding bike. Riding uphill with loads is easy by motor powered by generation and human power by pedals and handle. At downhill, braking torque is used to generate electricity. For smaller wheel, it is easier to use tires that are resistant to puncture. When driving is performed by a motor, and human power is only used for generation, the sizes of pedals and pivoting handle are adjusted big to give pleasure of riding. The size of frame and tire are calculated and designed so that the steering, etc. are controlled by bodily movement of a rider. In order to give acceleration feeling by pressing the pedals, the bike is made to move faster by raising rpm of a motor, etc. when the pedals are pressed hard. Likewise, when a brake lever is pressed strongly, braking power of the electric brake is adjusted strong. Since rotating generator fast increases braking power, this means that the speed change ratio of the speed change gear between the wheel and generator is controlled.

For mountain bikes, the distribution of weight and feeling of handling should not be much different from those of non-electric bikes. When manual speed reduction or increase mechanism is replaced by motor driven speed change gearset, the gearset can be made smaller thereby reducing weight, compensating the weight increase of motor and battery. Except hard braking, the torque created by braking, that is, by reducing speed of bike, is used to generate electricity. Hard braking put a rider in danger and should be avoided. Hard braking is used when absolutely necessary. A brake lever is designed to divide non-hard braking and hard braking.

A drive system not using a chain is provided; rotating the wheels is performed by an electric motor. Brake and suspension may be provided electric alternator or regenerative motor. The motor and brake are controlled to give natural feeling to a rider in her pedaling and maneuvering.

Driving and braking power needed for a bike is small. The size of mechanism could not be made smaller because a manually powered bike needed accommodation for human muscle movement. An electric mechanism is free from such concern, and can be made of optimal size and sealed. Elements for mechanical drive train including chain, cog, derailleur, shift lever, cable, etc. are omitted.

An electric bike can distribute weight by positioning a battery or motor in different locations. Designing a new center of gravity without limitations of chain drive mechanisms is advantageous. Mechanisms are concentrated in front and/or rear wheel hub motor assembly. A frame can be designed simpler without need of attaching a pedal motor assembly. A low maintenance bike is especially advantageous for bike tour. Charging stations and battery replacement services would be popular.

A pedal assembly may be used for generating electricity by pedaling or receiving braking torque, or for assisting motor. Upper body movements may transfer motion energy by crank or pivot mechanism to electric generator. Motor or brake may be automatically controlled to compensate shaking of rider's body according to upper body movements.

A frame becomes larger to receive the electrically powered mechanisms and battery. A larger elastic frame provides more vibration absorption and structural rigidity. Removal of separate case and assisting suspension reduces weight and manufacturing cost.

Regenerative brake may reduce capacity of battery thereby reducing weight of electric bike. An electric brake provides smooth brake feeling and broad range of braking due to ease of electric control.

Keeping cadence of a rider under adequate pedaling power is achieved by controlling motor driving torque or torque used for regenerative operation. Such control is further facilitated by rotation speed change mechanism that connects the motor and the wheel axle. Epicyclic gearing (planetary gear) or harmonic gear provides smaller coaxial mechanism.

A third wheel is provided coaxial with the pedals or near the pedals and connected to the pedal axis by gears. The third wheel provides the driving power for a bike. The front wheel is mainly used for steering, and the rear wheel is used to support the weight of the frame and rider. The front and rear wheels provide rotational inertia. The third wheel is spring loaded to keep contact with road. The front and rear suspension is not needed for traction purpose.

A linear alternator functions as suspension effective for short distance vibration. For no-chain bike, link type suspension is not needed for rear suspension and a simple fork type suspension used for front wheel can be used.

Motor is provided between pedal axis and rear axle. Chains or belt drives connect the three elements. Battery is surrounded by the belt in a sealed case.

The electric motor provides initial momentum such that a rider can easily move bike on uphill or on a rocky road. A falling prevention control mechanism is provided. Steering, brake and motor are controlled to prevent falling.

Human powered brake is for emergency purpose. Normally, the brake lever controls electric brake and regenerative brake generator. The pedal axis is rotated by electric force to give assisting or resistive force to the feet of the rider to enhance real or fun feeling. A sensor is installed to sense the rotation of the pedal axis to decide the pattern of the pedaling by rider, and controls the operation of the motor assembly, brake, suspension, steering, etc. according to the pattern.

No chain is needed if pedaling power is supplied electrically to the wheel. The feeling of pressing pedal is boosted by electric power. A rider wants faster speed or riding uphill when she presses the pedals. Driving torque by motor assembly is calculated to give feeling of pedal pressing effect to the rider.

Because driving force for wheel is not required on downhill, a motor assembly may be provided only at the front wheel.

The invention claimed is:

1. An electric bike comprising:
  a) a front wheel;
  b) a rear wheel;
  c) a seat for a rider to sit on;
  d) a frame that supports the front wheel, the rear wheel and the seat;
  e) a driving device that provides moving energy to the electric bike;
  f) a braking device that reduces the speed of the electric bike; and
  g) a pedal assembly that receives muscle power from the rider, wherein the pedal assembly comprises:
    1) a Pedal axis; and
    2) two pedals fixed to the pedal axis,
  wherein the driving device comprises one or more electric motors, further comprising a suspension device, wherein the suspension device comprises a linear alternator or a regenerative motor with a worm gearset, wherein the suspension device is controlled to adjust a stiffness and a stroke.

2. The electric bike of claim 1, wherein the control device controls the motor and a speed change device of the driving device, the braking device and the suspension device.

3. An electric bike comprising:
  a) a front wheel;
  b) a rear wheel;
  c) a Seat for a rider to sit on;
  d) a frame that supports the front wheel, the rear wheel and the seat;
  e) a driving device that provides moving energy to the electric bike;

f) a braking device that reduces the speed of the electric bike; and
g) a pedal assembly that receives muscle power from the rider, wherein the pedal assembly comprises:
1) a pedal axis; and
2) two pedals fixed to the pedal axis,
wherein the driving device comprises one or more electric motors, wherein the motor of the driving device is provided between the pedal axis and a rear axle, wherein a chain or belt drive connects the pedal axis, the motor and the rear axle, wherein a battery is surrounded by the chain or belt drive in a sealed case.

4. An electric bike comprising:
a) a front wheel;
b) a rear wheel;
c) a seat for a rider to sit on;
d) a frame that supports the front wheel, the rear wheel and the seat;
e) a driving device that provides moving energy to the electric bike;
f) a braking device that reduces the speed of the electric bike; and
g) a pedal assembly that receives muscle power from the rider, wherein the pedal assembly comprises:
1) a pedal axis; and
2) two pedals fixed to the pedal axis,
wherein the driving device comprises one or more electric motors, wherein a brake lever does not normally provide a braking force but a control signal controlling the regenerative brake, wherein at an emergency, the brake provide force required for a mechanical brake device thereby operating an additional brake device.

5. An electric bike comprising:
a) a front wheel;
b) a rear wheel;
c) a seat for a rider to sit on;
d) a frame that supports the front wheel, the rear wheel and the seat;
e) a driving device that provides moving energy to the electric bike;
f) a braking device that reduces the speed of the electric bike; and
g) a pedal assembly that receives muscle power from the rider, wherein the pedal assembly comprises:
1) a pedal axis; and
2) two pedals fixed to the pedal axis,
wherein the driving device comprises one or more electric motors, wherein the control device controls the driving power and braking power of the front and rear wheels depending on rider's operation of a brake lever or a drive lever, sensing movement of rider's body with respect to the frame with a motion sensor, or the trail information sensed by its visual sensor, or pre-stored or network received geographic information.

6. An electric bike comprising:
a) a front wheel;
b) a rear wheel;
c) a seat for a rider to sit on;
d) a frame that supports the front wheel, the rear wheel and the seat;
e) a driving device that provides moving energy to the electric bike;
f) a braking device that reduces the speed of the electric bike; and
g) a pedal assembly that receives muscle power from the rider, wherein the pedal assembly comprises:
1) a pedal axis; and
2) two pedals fixed to the pedal axis,
wherein the driving device comprises one or more electric motors, wherein when a brake lever is pressed strongly, braking power of the braking device that comprises a regenerative motor is adjusted strong, wherein the speed change ratio of a speed change gear between the wheel and the regenerative motor is controlled.

7. An electric bike comprising:
a) a front wheel;
b) a rear wheel;
c) a seat for a rider to sit on;
d) a frame that supports the front wheel, the rear wheel and the seat;
e) a driving device that provides moving energy to the electric bike;
f) a braking device that reduces the speed of the electric bike; and
g) a pedal assembly that receives muscle power from the rider, wherein the pedal assembly comprises;
1) a pedal axis; and
2) two pedals fixed to the pedal axis,
wherein the driving device comprises one or more electric motors, further comprising an electrically operated steering device, wherein the control device controls the steering device, the braking device and the driving device to keep stable movement of the bike.

8. An electric bike comprising:
a) a front wheel;
b) a rear wheel;
c) a seat for a rider to sit on;
d) a frame that support the front wheel, the rear wheel and the seat;
e) a driving device that provides moving energy to the electric bike;
f) a braking device that reduces the speed of the electric bike; and
g) a pedal assembly that receives muscle power from the rider, wherein the pedal assembly comprises:
1) a pedal axis; and
2) two pedals fixed to the pedal axis,
wherein the driving device comprises one or more electric motors, wherein the pedal axis is rotated by electric force to give assisting or resistive force to the feet of the rider, wherein a sensor is installed to sense the rotation of the pedal axis to decide a pattern of the pedaling by rider, and controls the operation of the electric motors, the braking device, according to the pattern.

* * * * *